(12) United States Patent
Salva et al.

(10) Patent No.: US 11,524,292 B2
(45) Date of Patent: Dec. 13, 2022

(54) PROGRAMMABLE HYDRAULIC RESISTOR ARRAY FOR MICROFLUIDIC CHIPS

(71) Applicant: INTERNATIONAL BUSINESS MACHINES CORPORATION, Armonk, NY (US)

(72) Inventors: Marie Salva, Zurich (CH); Yuksel Temiz, Zug (CH); Yulieth Cristina Arango, Zurich (CH); Onur Gökçe, Zurich (CH); Emmanuel Delamarche, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 16/281,131

(22) Filed: Feb. 21, 2019

(65) Prior Publication Data
US 2020/0269243 A1 Aug. 27, 2020

(51) Int. Cl.
*B01L 3/00* (2006.01)

(52) U.S. Cl.
CPC ... *B01L 3/502746* (2013.01); *B01L 3/502715* (2013.01); *B01L 3/502738* (2013.01);
(Continued)

(58) Field of Classification Search
None
See application file for complete search history.

(56) References Cited

U.S. PATENT DOCUMENTS

| 10,029,256 B2 | 7/2018 | Abate et al. |
| 2013/0337578 A1* | 12/2013 | Delamarche .......... B01L 3/5027 436/180 |

(Continued)

FOREIGN PATENT DOCUMENTS

| CN | 103959069 A * | 7/2014 | .......... G01N 1/4077 |
| WO | 2018042190 A1 | 3/2018 | |

OTHER PUBLICATIONS

Gervais et al., Toward one-step point-of-care immunodiagnostics using capillary-driven microfluidics and PDMS substrates, 2009, vol. 9, p. 3330-3337. (Year: 2009).*

(Continued)

*Primary Examiner* — Lore R Jarrett
(74) *Attorney, Agent, or Firm* — Cantor Colburn LLP; Daniel Morris (57) ABSTRACT

Embodiments of the invention provide a microfluidic chip having microfluidic structures formed on a surface. The structures form an input channel, an output channel, auxiliary channels, and a hydraulic resistor structure connecting the input channel to the output channel via the auxiliary channels. The resistor structure includes N flow resistor portions (N≥2), which are connected to the auxiliary channels. The chip further includes at least N−1 actuatable valves, which are arranged in respective ones of the auxiliary channels. The actuation state of the valves can determine the effective hydraulic resistance of the resistor structure. The valves can be electrogates, each including a liquid-pinning trench arranged in a respective one of the auxiliary channels that define a flow path for a liquid introduced therein, so as to form an opening that extends across said flow path. Each electrogate can further include an electrode extending across the flow path.

18 Claims, 7 Drawing Sheets

(52) U.S. Cl.
CPC ............... *B01L 2200/0605* (2013.01); *B01L 2300/0867* (2013.01); *B01L 2400/0487* (2013.01); *B01L 2400/0655* (2013.01); *B01L 2400/082* (2013.01)

(56) References Cited

U.S. PATENT DOCUMENTS

2017/0100717 A1* 4/2017 Autebert .......... B01L 3/502784
2017/0120240 A1* 5/2017 Delamarche ...... B01L 3/502715

OTHER PUBLICATIONS

Translation of CN 103959069 A. (Year: 2014).*
Anonymous, "Biomedical Advanced Research and Development Authority," Feb. 4, 2019, pp. 1-2, retrieved from the Internet www.phe.gov/about/BARDA/Pages/default.aspx.
Anonymous, "Diagnostic platforms," Feb. 4, 2019, pp. 1-10, retrieved from the Internet https://www.vttresearch.com/services/health-and-wellbeing/molecular-diagnostic-sensors-and-reagents.
Anonymous, "Imec R&D, nano electronics and digital technologies," Feb. 4, 2019, pp. 1-9, retrieved from the Internet https://www.imec-int.com/en/home.
Anonymous, "Lab-on-a-chip and MEMS solutions," Feb. 4, 2019, pp. 1-6, retrieved from the Internet https://www.micronit.com/.
Anonymous, "VTT—Beyond the obvious," Feb. 4, 2019, pp. 1-3, retrieved from the Internet https://www.vttresearch.com/.
Arango et al., "Electrogates for Stop-and-Go Control of Liquid Flow in Microfluidics," Applied Physics Letters 112, 153701 (2018), pp. 1-14.
Gu et al., "Computerized microfluidic cell culture using elastomeric channels and Braille displays," PNAS, vol. 101, No. 45, Nov. 9, 2004, pp. 15861-15866.
Im et al., "A disposable on-chip microvalve and pump for programmable microfluidics," Lab Chip, Mar. 22, 2018, pp. 1310-1319.
Temiz et al., "Sub-nanoliter, Real-Time Flow Monitoring in Microfluidic Chips Using a Portable Device and Smartphone," Scientific Reports, vol. 8, Article No. 10603 (2018), pp. 1-19.
Weaver et al., "Static control logic for microfluidic devices using pressure-gain valves," Nature Physics, vol. 6, Jan. 31, 2010, pp. 1-6.
Weibel et al., "Torque-Actuated Valves for Microfluidics," Anal. Chem., 2005, vol. 77, No. 15, Aug. 1, 2005, pp. 4726-4733.
Zhang et al., "Hand-powered centrifugal microfluidic platform inspired by the spinning top for sample-to-answer diagnostics of nucleic acids," Lab Chip, 2018,18, pp. 610-619.

* cited by examiner

FIG. 5C $R_{Tot} > R_B > R_A$

PROGRAMMABLE HYDRAULIC RESISTOR ARRAY FOR MICROFLUIDIC CHIPS

STATEMENT REGARDING FEDERALLY SPONSORED RESEARCH OR DEVELOPMENT

This invention was made with Government support under Contract No.: EU e-Gates & CAPSYS awarded by EU funded projects (Switzerland).

BACKGROUND

The invention relates in general to the field of microfluidic chips and methods of controlling liquid flows in such chips. In particular, it is directed to a microfluidic chip comprising a hydraulic resistor structure with actuatable valves, arranged in a resistor structure to make it programmable.

Microfluidics deals with the precise control and manipulation of small volumes of fluids. Typically, such volumes are in the sub-milliliter range and are constrained to micrometer-length scale channels. Prominent features of microfluidics originate from the peculiar behavior that liquids exhibit at such scales. Flow of liquids in microfluidics is typically laminar. Microfluidic devices generally refer to microfabricated devices, which are used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g., filtration, dissolution of reagents, heating, washing, reading of signal, etc.). Metallic electrodes are sometimes patterned inside or across microchannels of the device.

Microfluidics has opened the door for applications in many areas of healthcare and life sciences, such as point-of-care diagnostics (POCDs), environmental analysis, and drug discovery. POCDs strongly benefit from microfluidic technologies due to the miniaturization of tests, which enhances portability and the integration of various functions into one diagnostic device. For instance, many bioassay tests rely on microfluidic functions and microfabrication to increase their precision and multiplexing capabilities.

However, one major limitation of POCD devices is the lack of flexibility in defining/changing assay conditions "on the fly", i.e., shortly before using them or during operations, because flow paths are typically encoded on a design level and set during microfabrication. This translates into devices that must be operated according to well-defined protocols and where flow rates and volumes of displaced liquids cannot easily be changed during operation without using active micro-components. There is accordingly a need for more flexible devices.

In a microfluidic system, controlling the flow rate is notably important to: mix different liquids, control the timing of a biological reaction, and/or control the concentration of liquid. More generally, several applications may require varying the flow rate of liquid advancing along channels of the device. In addition, a high dynamic range is often desired for the liquid flow rate, which can be useful in point-of-care (POC) applications where convection and diffusion play a critical role in determining the outcome of ligand-receptors reactions such as DNA hybridization or immunoassay.

In capillary-driven flow microfluidics, flow rates are usually encoded (irreversibly) on the design and fabrication levels. Many devices use mechanical systems to control the flow rate. For example, pneumatic valves, such as pressure-gain valves are known, which can be integrated directly into the microfluidic chip. Such valves, however, are usually difficult to fabricate, owing to complex multi-layer structures, involving deformable materials. Besides, they provide a limited dynamic range of pressure and their response is sometimes unreliable.

Torque-actuated valves may be used to modulate a liquid flow in microfluidics. Such valves are easy to fabricate and operate. However, they cannot be operated electronically; they are manually manipulated and are thus relatively slow. Furthermore, they have a relatively large size, owing to the diameter of the screws (screws smaller than 500 µm are difficult to operate), which result in low-density configurations (~16 valves/cm$^2$).

Moreover, programmable micro-pump systems are known, which involve low-cost, polydimethylsiloxane (PDMS) pumps and valves. However, they need be pressurized (like pneumatic valves) and therefore need an external linear motor; they further require an external system controlled by a programmed microprocessor to maneuver the single roller bar.

Braille pin systems may also be used, which allow integrated pumps and valves, and possibly computerized fluidic control. However, the pins need again be pressurized. In addition, such systems are difficult to fabricate, notably due to their multi-layer structure. Also, each flow loop requires an individual pump. All the more, the footprint of Braille pins offer little flexibility in their placement on the chip; they cannot be closely spaced.

Centrifugal microfluidic systems allow efficient manipulation and mixing of preloaded fluids through on-chip capillary valves. However, they involve an expansive, bulky spinning system (with large discs), which need be operated by a user. And, again, their multilayer structures make them difficult to fabricate on-chip.

Several other liquid actuation mechanisms are known. In particular, electrowetting principles are already used for controlling the shape and movement of droplets of liquids. However, they require large actuation voltages (typically larger than 10V) and their fabrication processes are challenging.

SUMMARY

According to a first aspect, the present invention is embodied as a microfluidic chip. The chip comprises a surface with microfluidic structures formed thereon. The structures form an input channel, an output channel, auxiliary channels, and a hydraulic resistor structure connecting the input channel to the output channel via the auxiliary channels. The resistor structure comprises N flow resistor portions (N≥2), which are connected to the auxiliary channels. The chip further includes at least N−1 actuatable valves, which are arranged in respective ones of the auxiliary channels: the actuation state of the valves determines the effective hydraulic resistance of the resistor structure.

Thanks to the above solution, the flow rate obtained in output of the resistor structure can be modified by actuating the valves. The output flow is a function of the hydraulic resistances of the flow resistor portions that are as enabled by the actuation state of the valves. The output flow rate can thus be defined after fabrication of the chip. Aside from the valves (which can be simple electrogates, as in embodiments of the invention described herein), the chip may have a generic design. The present chips can notably be used in a microfluidic system for controlling the flow rate, e.g., in order to mix different liquids, control the timing of a biological reaction, or, still, control the concentration of species in a liquid. The present devices may notably be embodied as point-of-care (POC) diagnostic devices. In that respect, a large dynamic range of flow rates may possibly be obtained in output, which can be useful in POC applications involving, for example, laminar flows, diffusion immunoassay, and ligand-receptors reactions such as DNA hybridization.

The hydraulic resistor structure may notably be configured as an array comprising N distinct flow resistors, the latter connected to the auxiliary channels.

The chip may for example include at least N−1 auxiliary channels branching from the input channel to said resistor structure. Actuatable valves such as defined above may thus be arranged in respective ones of said at least N−1 auxiliary channels.

In a first class of embodiments, the resistor portions have distinct hydraulic resistances and are connected in parallel between the input channel to the output channel, via the auxiliary channels.

The chip may for instance comprise pairs of auxiliary channels, these including, on the one hand, upstream channels branching from the input channel to respective ones of the resistor portions and, on the other hand, downstream channels branching from respective ones of the resistor portions to a section of the output channel. The valves are inserted, each, in one or each of the upstream channels and the downstream channels of at least some of said pairs of auxiliary channels.

The resistor portions may notably be formed as distinct resistors, which form channel sections of successively decreasing footprint lengths, the latter measured along an average flow propagation direction y in the resistors. This direction y is transverse to each of the input channel and said section of the output channel in a plane subtended by said surface. In that case, sections of the input and output channels can have a trapezoidal shape, i.e., the input channel does not extend parallel to said section of the output channel, to best accommodate the decreasing footprint lengths.

The chip may for example include N pairs of actuatable valves, wherein valves of each of the N pairs are arranged on opposite sides of the resistor portions. In variants, actuatable valves are located upstream the resistor portions, while vented, one-way capillary valves are provided downstream of the resistor portions. In other words, each of the resistor portions connects, on the one hand, from the input channel via a respective one of the auxiliary channels (in which an actuatable valve is arranged) and, on the other hand, to a section of the output channel via a one-way capillary valve that comprises a vent.

The microfluidic structures can be recessed, i.e., defined as cavities or grooves recessed within a thickness of a material defining said surface, wherein the recessed structures have essentially a same, constant depth. Still, the depth may locally vary. For example, the depth of the recessed structures may slightly differ at the levels of junctions formed between the downstream channels and the output channel. In other words, the junctions can have a depth that is larger than the average depth of the recessed structures forming the remaining structures. In fact, an entire portion of the output channel, in which such junctions are formed, can be made deeper than the rest of the structures.

In another class of embodiments, the N resistor portions are connected in series, so as to form a continuous channel branching from the input channel and leading to the output channel. The chip may for instance include at least N−1 auxiliary channels branching from the input channel to said continuous channel, at locations delimiting (or defining) said resistor portions, where the actuatable valves are arranged in respective ones of the at least N−1 auxiliary channels. E.g., N or N+1 auxiliary channels may be provided, as exemplified later.

In embodiments of the invention, the valves can be implemented as electrogates. In other words, each valve includes a liquid-pinning trench arranged in a respective one of the auxiliary channels, the latter defining respective flow paths for liquid introduced therein. The trench forms an opening that extends across a respective flow path. The valves further include, each, an electrode extending across the flow path so as to at least partly overlap with a respective liquid-pinning trench. Such valves (also referred to as electrogates in this document) allow an efficient, reliable, and easy-to-implement flow control mechanism, relying on simple geometrical pinning and electrode structures, which can easily be fabricated.

Said flow path may for example be defined by walls of the auxiliary channels. In other words, an auxiliary channel may include a bottom wall and lateral walls, the latter arranged on each side of and contiguous with the bottom wall, whereby the opening of the trench extends across said bottom wall.

The trench can have a curvature, whereby the opening has a convex profile across said bottom wall. This profile forms acute external angles with said lateral walls, in a plane subtended by the bottom wall and at intersections between said bottom wall and said lateral walls. The opening may notably have a curvilinear profile.

According to another aspect, the invention is embodied as a method for controlling a flow of liquid in a microfluidic device such as described above. According to this method, a liquid is introduced in the input channel for the liquid to reach the output channel via the resistor structure. The actuation state of the valves is maintained or modified (prior to, while or after introducing the liquid), so as to achieve a desired, effective hydraulic resistance of the resistor structure. Such a method can notably be used for varying the output flow rate, by actuating one or more of the valves (which modifies the overall actuation state of the valves), e.g., in view of mixing different liquids, controlling the timing of a biological reaction, or, still, the concentration of species in a liquid.

As noted above, the valves can be configured as electrogates, each comprising a liquid-pinning trench and an electrode extending so as to at least partly overlap with the trench. In that case, liquid is introduced in the input channel, so as to reach each of the gates and get pinned at respective trenches of the gates. Now, the actuation state of the valves can be modified by applying a direct current voltage to liquid pinned at one or more of the trenches, via one or more electrodes of the corresponding gates, for the liquid to overcome the trench(es) and reach the output channel.

Microfluidic devices, systems and methods embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 1A-3B schematically depict possible architectures of microfluidic chips with programmable, hydraulic resistor structures, according to embodiments of the invention, in which:

FIGS. 5A-5D show top views of another architecture, where resistor portions of the hydraulic flow resistor structure are connected in series in accordance with embodiments of the invention, in which:

FIGS. 7A-7D illustrate the operation principle of a capillary-driven microfluidic chip having an actuatable valve implemented as a gate including a trench and an electrode overlapping the trench in accordance with embodiments of the invention, in which:

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

The invention notably concerns a microfluidic chip comprising a hydraulic resistor structure with actuatable valves, arranged in the resistor structure so as to make it programmable. The actuation state of the valves determines the effective hydraulic resistance of the resistor structure, such that the resistance can be modified at will, after fabrication of the chip. This is discussed in detail in the following description, which is structured as follows. First, general embodiments and high-level variants are described (sect. 1). The next section addresses more specific embodiments and technical implementation details (sect. 2).

1. General Embodiments and High-Level Variants

In reference to FIGS. 1-7, an aspect of the invention is first described, which concerns a microfluidic chip 1, 1a.

The chip notably includes a surface S with various microfluidic structures formed thereon. Together, such structures form an input channel 110, an output channel 130, as well as auxiliary channels 121, 123, 124, and a hydraulic resistor structure 120. The hydraulic resistor structure 120 basically connects the input channel 110 to the output channel 130, via the auxiliary channels.

Figure 1A:
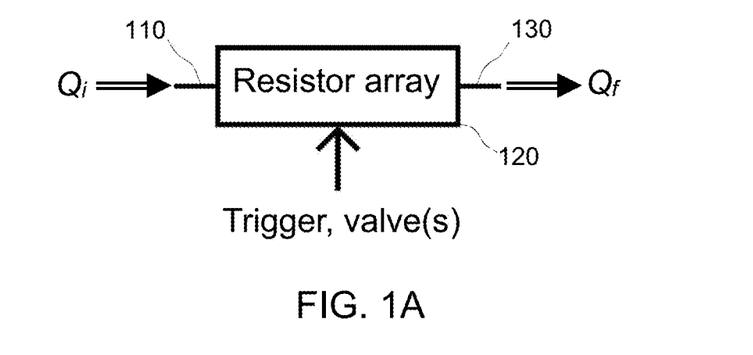
FIG. 1A illustrates the general principle, whereby the effective hydraulic resistance of the resistor structure can be varied thanks to actuatable valves placed in trigger channels (auxiliary channels) connected to the resistor structure.
Figure 2A:
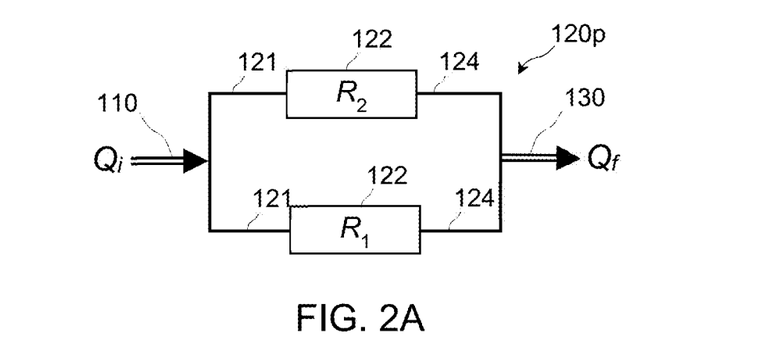
FIG. 2A illustrates resistors connected in parallel in accordance with aspects of the invention.
Figure 2B:
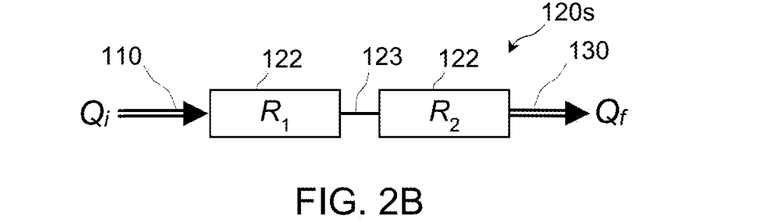
FIG. 2B illustrates resistors connected in series in accordance with aspects of the invention.
Figure 2C:
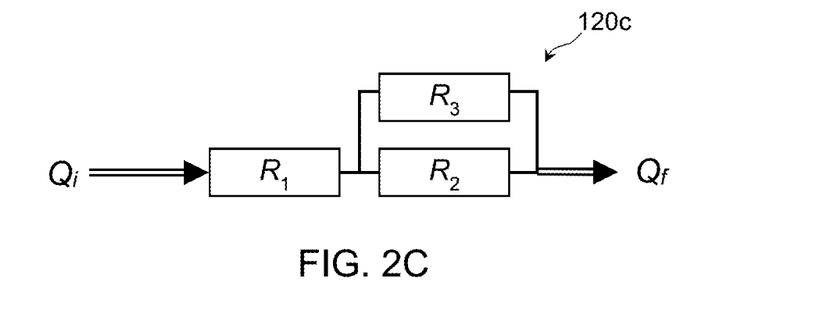
FIG. 2C illustrates resistors connected according to a more complex network in accordance with aspects of the invention.
Figure 3A:
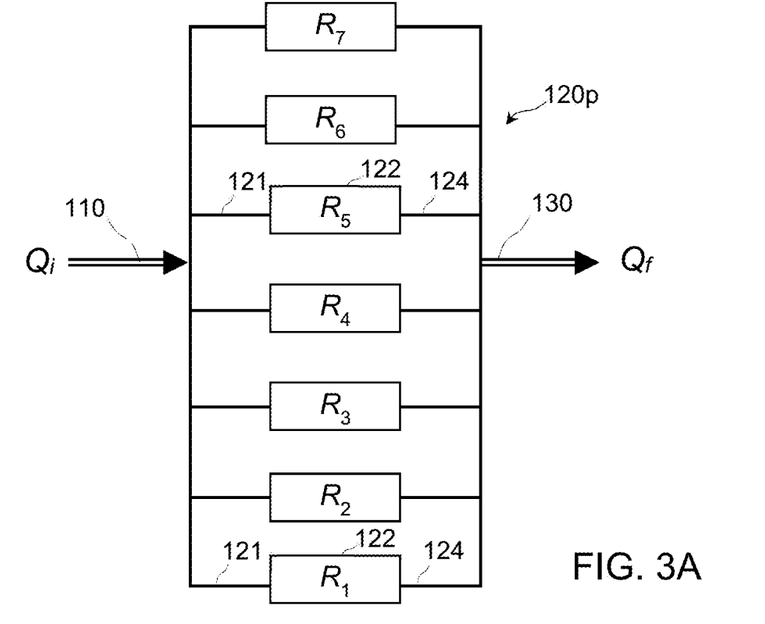
FIG. 3A illustrates a parallel architecture involving seven resistors.
Figure 3B:
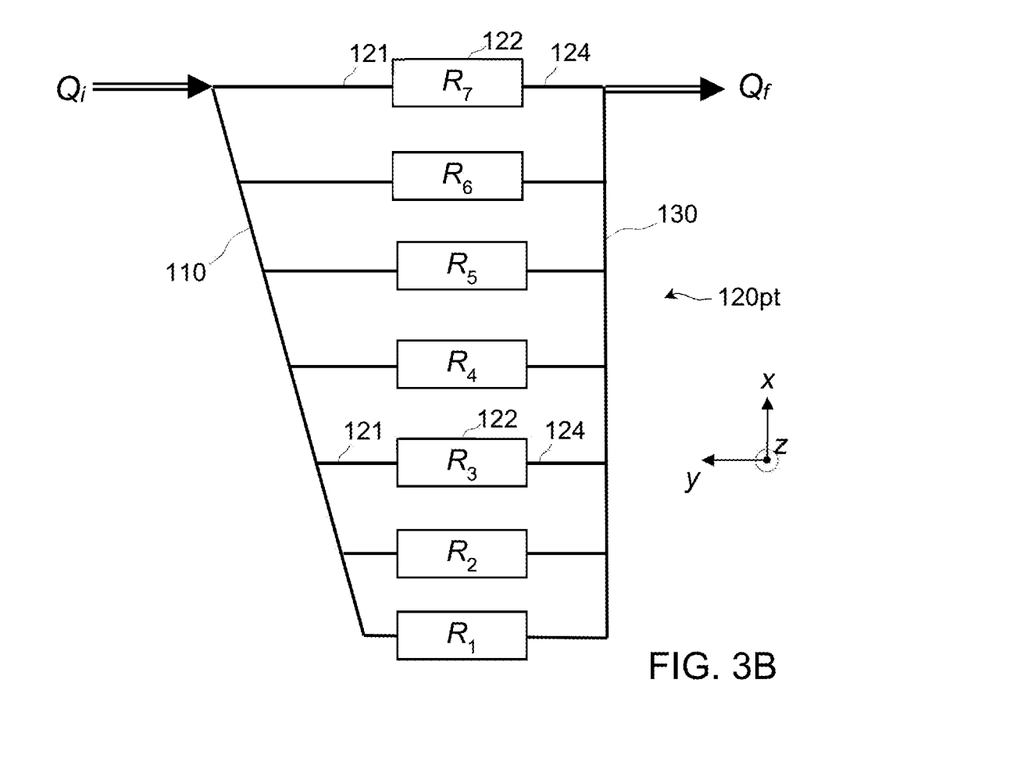
FIG. 3B shows a variant to FIG. 3A, where sections of the input and output channels form a trapezoidal structure, to accommodate resistors of different footprints.
Figure 4A:
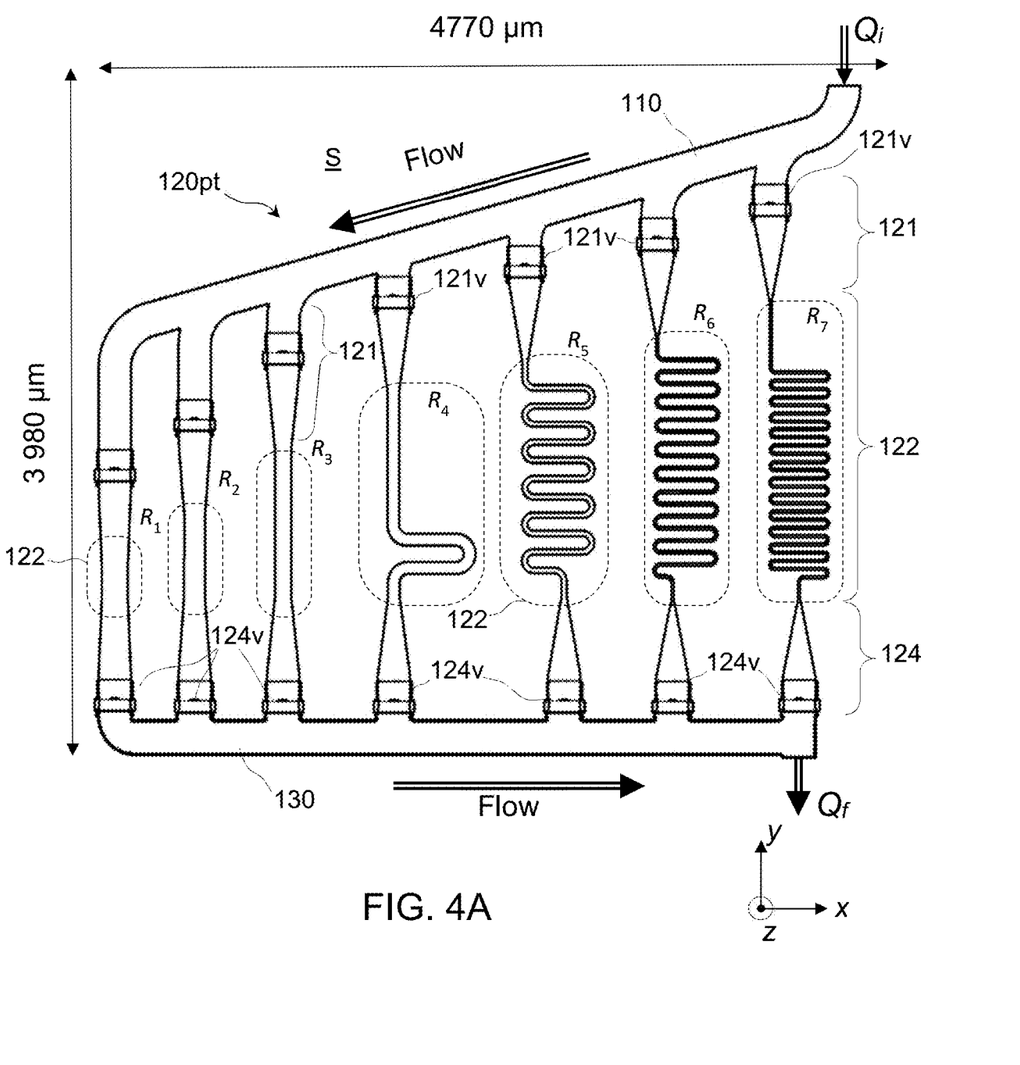
FIG. 4A is a top view of an actual flow resistor array, corresponding to FIG. 3B (though rotated with respect to the latter in the plane of the figure), wherein several pairs of actuatable valves are arranged on opposite sides of the resistors of the array, as in embodiments of the invention.

The resistor structure 120 comprises N flow resistor portions 122, 122$p$, where N≥2, as illustrated in FIGS. 1-3. The resistor portions 122, 122$p$ are connected to (by) the auxiliary channels 121, 123, 124. The hydraulic resistor structure 120 may for example form an array of distinct flow resistors 122, as illustrated in FIG. 4A, where the resistors are connected in parallel. In that case, the resistors shall have different characteristics, so as to have distinct hydraulic resistances. On the contrary, in linear arrangement (series) such as illustrated in FIG. 5, the resistor portions 122$p$ may together form a single, continuous channel 120$s$, wherein the resistor portions are nevertheless defined (or determined) by junctions formed with the auxiliary channels and valves therein.

Note, in the present document, the terminology "resistor" or "flow resistor" is sometimes used in respect of embodiments where the resistor portions are well separated on the surface S (as in the parallel arrangement of FIG. 4A), whereas the terminology "resistor portion" or "flow resistor portion" may be used to denote a portion 122$p$ of a continuous channel 120$s$, as shown in FIG. 5. Still, it remains that a resistor 122 as depicted in FIG. 4A can also be regarded as a portion of the overall hydraulic resistor array 120 and, as such, can also be referred to as a "resistor portion". Thus, the terminologies "resistor" and "resistor portion" are interchangeably used in this document.

The chip 1, 1$a$ further includes actuatable valves 121$v$, 124$v$, arranged in at least some (possibly all) of the auxiliary channels 121, 124. At least N−1 actuatable valves are required, in order to be able to exploit N resistor portions. A minimal architecture as shown in FIG. 2A or 2B would involve at least one actuatable valve. However, the chip shall typically include more valves, e.g., N, or 2 N valves, such that each resistor portion may be connected to a respective valve 121v or arranged between two valves 121v, 124v, as in examples discussed below. Plus, additional valves may be included, e.g., in external portions of the input and output channels, as discussed later.

Figure 5A:
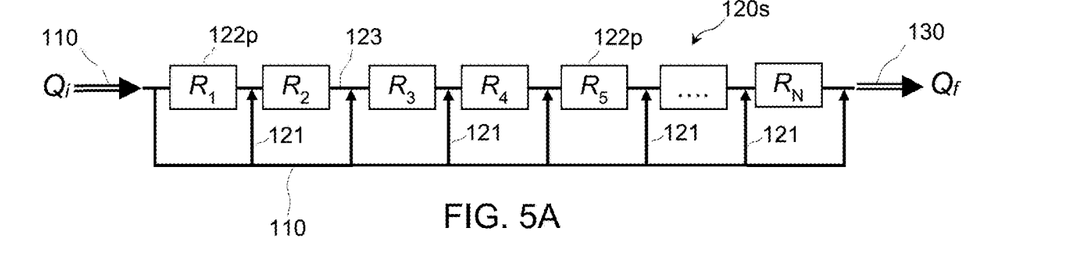
FIG. 5A depicts the general architecture for N resistor portions.
Figure 5B:
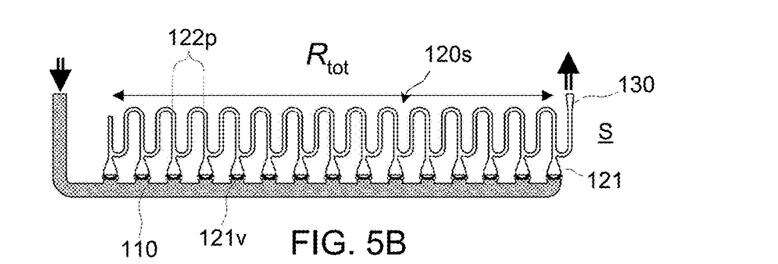
FIG. 5B illustrates the operation of an actual flow resistor structure formed as a continuous channel, wherein fourteen resistor portions are delimited by fifteen junctions formed with auxiliary (trigger) channels including respective valves.
Figure 5C:
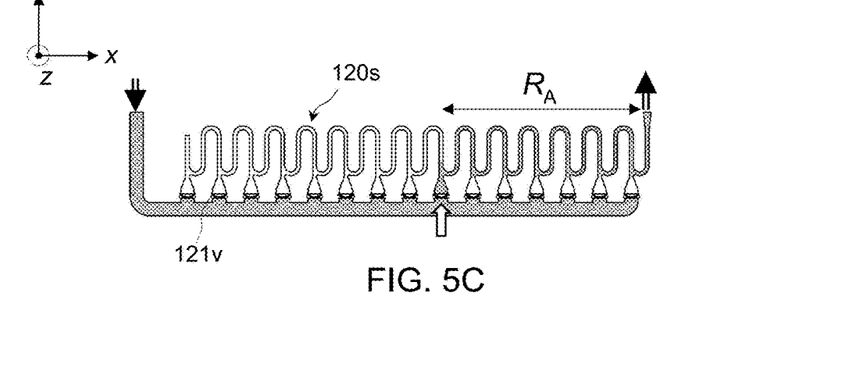
FIG. 5C illustrates additional operation of an actual flow resistor structure formed as a continuous channel, wherein fourteen resistor portions are delimited by fifteen junctions formed with auxiliary (trigger) channels including respective valves.
Figure 5D:
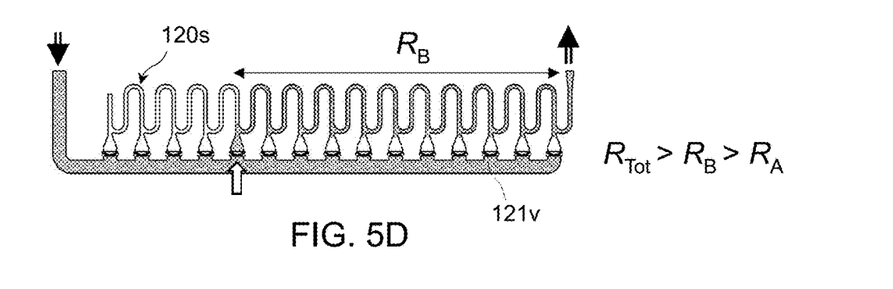
FIG. 5D illustrates additional operation of an actual flow resistor structure formed as a continuous channel, wherein fourteen resistor portions are delimited by fifteen junctions formed with auxiliary (trigger) channels including respective valves.

In all case, the actuation state of the valves determines the effective hydraulic resistance of the resistor structure 120, as illustrated in FIGS. 5B-5D. Note, the term "actuation state" as used herein is not necessarily indicative of a binary condition of the valves. Indeed, the present valves may have intermediate actuation states (e.g., may be partly open, this depending on the type of valves used). Still, a valve will exhibit at least two states, i.e., one in which it is closed and another one it is open. It may possibly exhibit a number of intermediate states, and possibly an infinity of intermediate states if the state of the valve can be continuously varied.

Figure 4B:
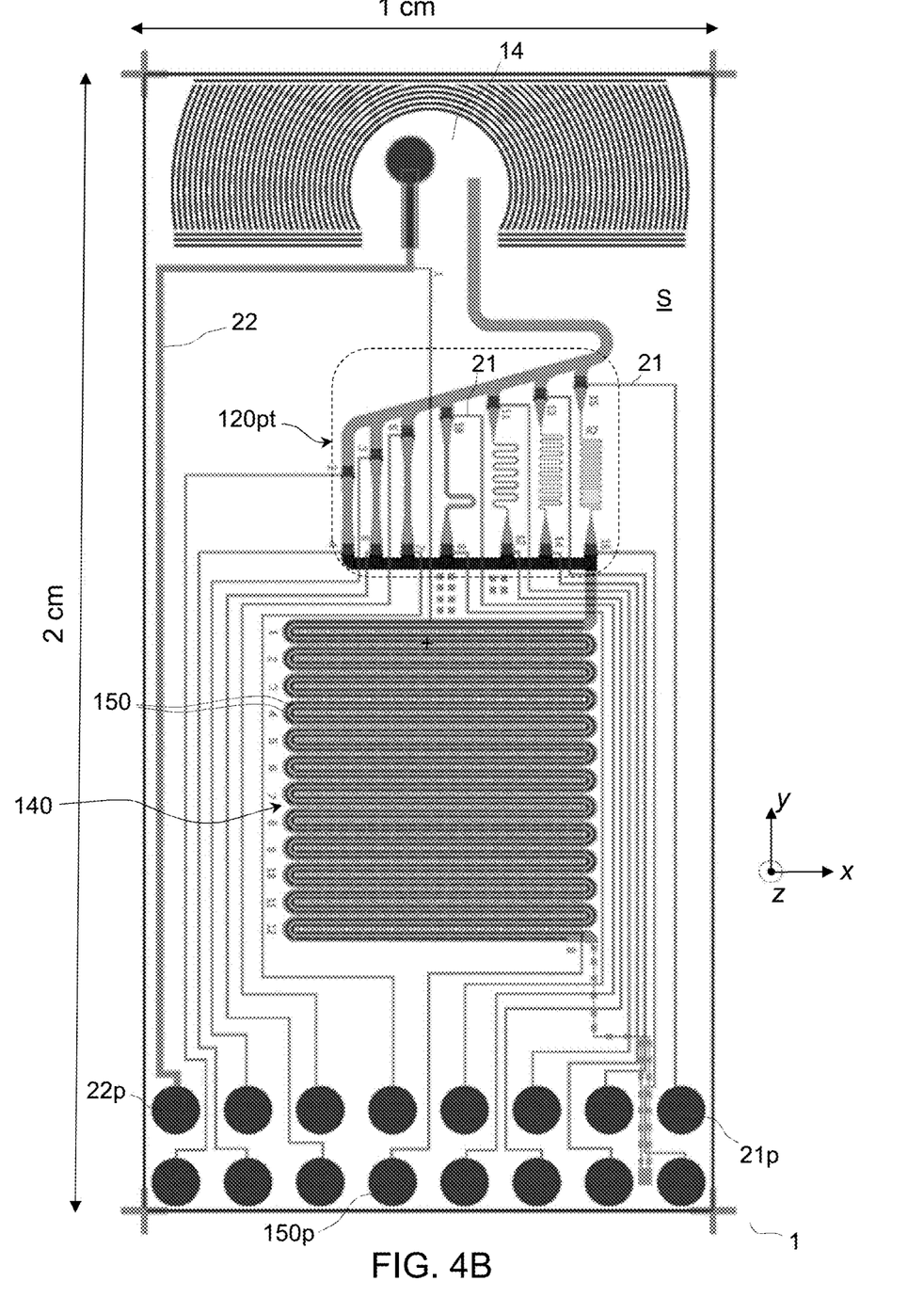
FIG. 4B is a top view of a microfluidic chip design implementing a hydraulic flow resistor array as in FIG. 4A, according to embodiments.

All channels mentioned above are typically microchannels, a characteristic depth of which is in the micrometer-length range. The microchannels and the device 1, 1a as a whole, are designed so as to allow capillary-driven flows. In other words, the flow paths defined by the channels may be wetting for typical liquids as used in point-of-care (POC) devices and other microfluidic devices. One or more capillary pumps 140 may thus be involved, along and/or downstream of the flow paths defined, as illustrated in FIG. 4B. Still, the present concepts can be extended to liquid flows in a non-wetting flow paths and microfluidic systems using other liquid pumping techniques (e.g., active or pressure-driven pumping, electroosmotic pump, vacuum, etc.). In some embodiments of the invention, however, passive pumping means and wetting channels can be relied upon.

Figures 7A, 7B:
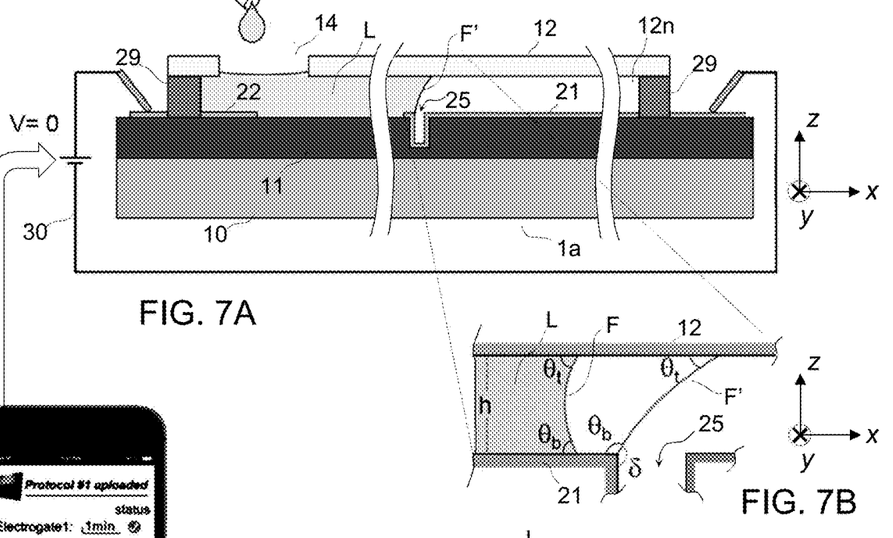
FIG. 7A is a side view showing elements forming a flow path for a liquid and a gate, wherein liquid is pinned at the trench (no voltage is applied yet)
FIG. 7B shows a magnified view of the liquid pinned at the gate, in the plane of FIG. 7A.
Figure 7C:
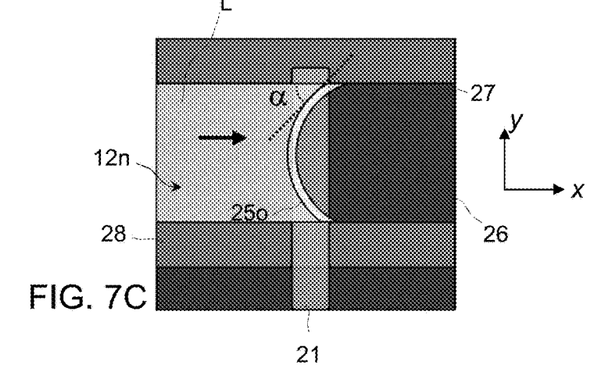
FIG. 7C is a top view of the channel and the gate, showing the angle α between the lateral wall and the tangent of the opening of the trench near the lateral wall.
Figure 7D:
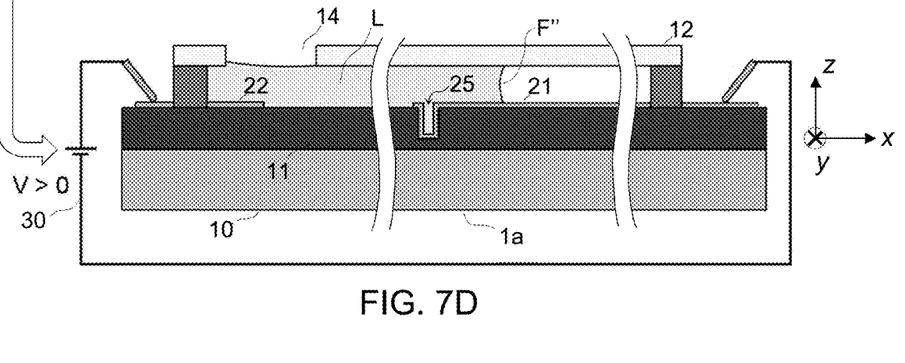
FIG. 7D is another side view, similar to FIG. 7A, which shows the flow being resumed after activation of the gate, upon applying a voltage.

Thus, the chip 1, 1a includes one or more valves, which can be programmatically actuated, e.g., via or by an external device such as smartphone 50, as illustrated in FIG. 7. In other words, the valves are arranged in the resistor structure so as to make it programmable: actuating one or more of the valves (or not) determines the effective hydraulic resistance of the resistor structure, which in turn impacts the output flow rate, as illustrated in FIG. 1A. In other words, the hydraulic resistor structure forms, together with the actuatable valves, a programmable resistor structure.

Thanks to the present solution, the flow rate obtained in output of the resistor structure 120 (in the output channel 130) can be modified (programmed) by actuating the valves 121v, 124v. The output flow is a function of the hydraulic resistances of the flow resistor portions 122, 122p and is typically determined by the resistor portion of least resistance, as enabled by the actuation state of the valves. According to the present designs, the output flow rate can be defined after fabrication of the chip. Aside from the valves (which can be simple electrogates, as in embodiments of the invention described herein), the chip may have a generic design, i.e., merely consisting of recessed structures provided on the surface S of an upper layer of the chip (as assumed in FIG. 4B), which recessed structures shall typically be closed by an additional layer (not shown) covering the main layer.

Such a device can notably be used in a microfluidic system for controlling the flow rate, e.g., in order to mix different liquids, control the timing of a biological reaction, or, still, control the concentration of species in a liquid. The present devices may notably be embodied as POC diagnostic devices. In that respect, a large dynamic range of flow rates may possibly be obtained in output, in particular when using a parallel architecture such as depicted in FIGS. 3-4, which can be useful in POC applications involving, for example, inertial flows, diffusion immunoassay, and ligand-receptors reactions such as DNA hybridization.

All this is now described in detail, in reference to particular embodiments of the invention. To start with, and as seen in FIGS. 4A, and 5B-5D, the chip can include at least N−1 auxiliary channels (trigger channels) 121 branching from the input channel 110 to said resistor structure 120, and at least N−1 valves arranged in respective auxiliary channels 121. In principle, N−1 valves suffice to exploit N resistor portions. Still, the device may possibly include more valves, e.g., N valves in channels branching upstream each of the resistors 122 (as in FIG. 6), or N+1 valves delimiting N resistor portions 122p on each end thereof (as in FIGS. 5B-5D), or, still, 2 N valves on each side of the resistors 122, as in FIG. 4.

Note, depending on the architecture chosen, only N−1 auxiliary channels 121, 124 may be required to serve N valves, upstream (respectively downstream) the resistor portions 122, 122p, since the input channel 110 (respectively the output channel 130) can also include a valve, at an end thereof (as in FIG. 4A). In variants such as depicted in FIG. 6, a common input 110 may split in N auxiliary channels 121 and, similarly, output channel portions 130 may collect liquid at N junctions, before merging into a single output channel 130.

Figure 6:
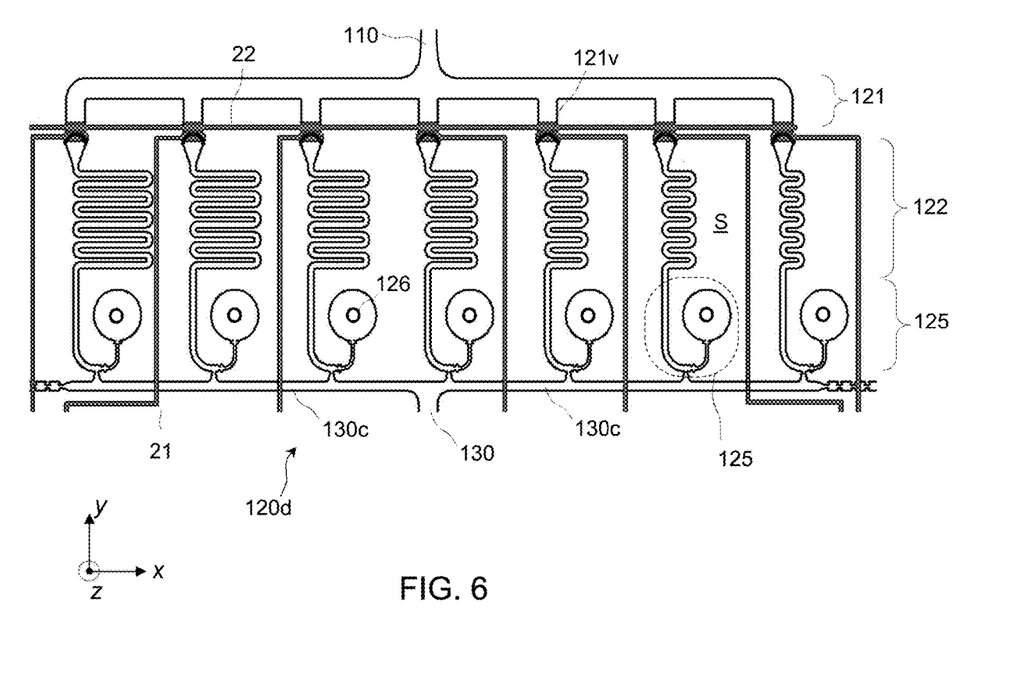
FIG. 6 is a top view of a variant to FIG. 4A, corresponding to the architecture of FIG. 3A, wherein the actuatable valves are located upstream the resistors, while vented capillary valves are provided downstream the resistors, as in embodiments.

In embodiments such as illustrated in FIGS. 4-6, the microfluidic structures are defined as recessed structures, i.e., cavities that extend within a superficial thickness of a material layer subtending the surface S, wherein said recessed structures have essentially a same, constant depth, which eases the fabrication process. Yet, the depth of the microfluidic structures may be locally altered, as in embodiments discussed later.

Referring now more specifically to FIGS. 2A, 3, 4, and 6, a class of embodiments is now described in detail, which concerns a chip 1 involving a parallel arrangement of the resistors 122. That is, the resistors 122 are connected in parallel between the input channel 110 and the output channel 130, via auxiliary channels 121, 124. In that case, the resistors 122 need have distinct hydraulic resistances. They may notably differ, geometrically and/or exhibit surfaces that are chemically processed to exhibit distinct surface properties. Compared to a linear arrangement of the resistors, a parallel arrangement allows a higher number of combinations of resistance values (up to 2 N−1, depending on the number of valves provided) and a larger dynamic range.

As further illustrated in FIGS. 4A and 6, a parallel arrangement typically includes pairs of auxiliary channels 121, 124. Upstream channels 121 branch from the input channel 110 to respective resistors 122, while downstream channels 124 branch from respective resistors 122 to the output channel, or a section thereof, or still, to an intermediate channel portion 130c leading to the output channel 130. That is, intermediate channels may be involved, such as the collecting sections 130c shown in FIG. 6. In such cases, the actuatable valves can be inserted in the upstream channels 121 and/or the downstream channels 124, as well as in an end portion of the input and output channels. Note, however, that in variants to the depictions shown in FIGS. 4 and 6, valves may be placed in only a subset of the upstream channels 121 and/or the downstream channels 124.

In the example of FIG. 4A, the hydraulic resistor structure 120 is configured as an array of N=7 distinct flow resistors 122 (also denoted by $R_1 \ldots R_7$), wherein the resistors are connected by pairs of auxiliary channels 121 and 124, respectively arranged upstream and downstream of the resistors 122. Moreover, the valves 121v, 124v are, in this example, arranged in each of the upstream channels 110, 121 and the downstream channels 124, 130 connecting the resistors 122. In other words, the design shown in FIGS. 4A, 4B includes N pairs of actuatable valves, which are arranged on opposite sides of the resistor portions 122. That is, each resistor is arranged between a respective pair of channels and valves 121v, 124v are inserted in each of the upstream and downstream channels connecting each of the resistors 122. Better flow control will normally be achieved when using valves 121v, 124v placed in each of the upstream 110, 121 and downstream 124, 130 channels. In the example of FIG. 6, however, valves are only placed in the upstream channels 121, whereas vented capillary valves 125 are provided in output.

Vented capillary valves allow resistors to be activated during the flow of the liquid, a thing that is not possible with any resistor structure. For example, the configuration (activation state) of the hydraulic resistor array shown in FIG. 4A or 4B is set at the beginning of the flow and cannot be changed later on, inasmuch as no additional resistors can be triggered once the liquid front reaches to the output channel or the capillary pump. However, vented capillary valves can be activated any time during the flow of the liquid because the trapped air can escape through the vertical air vents 126 and the liquid meniscus in the activated resistor merges to the liquid flowing in the main channel without creating an air bubble. For example, a flow rate can be created for a given amount of time, then this flow rate can be increased (already during the flow) by activating additional resistors as additional resistors increase the flow rate in a parallel configuration. Such a strategy could be particularly interesting when a biochemical reaction or assay requires multiple flow rates (e.g., slow flow rate for the assay, fast flow rate for rinsing).

As further seen in FIGS. 3B and 4A, distinct resistors 122 may form channel sections having distinct footprints. In general, the higher the resistance, the longer its length and the shortest its width. Conversely, the lowest the resistance, the shortest the length of the resistor and the largest its width. The footprint area of the resistors 122 are encircled by dashed lines in FIG. 4A. In particular, the lengths of extension of such areas may successively decrease from one resistor to the other. This length is measured along the average flow propagation direction (parallel to the direction y) in the resistors 122. The direction y is transverse to each of the input channel 110 and the output channel 130, in the (x,y) plane subtended by the surface S, the output channel extending along axis x in the example of FIG. 4. As further seen in FIGS. 3B and 4A, the input channel 110 does not extend parallel to the output channel 130 in this example. Rather, it forms an angle therewith, so as to best accommodate the decreasing footprint lengths of the resistors 122. In other words, the input channel 110 and the output channel 130 can be compared to legs (or lateral sides) of a trapezoid, e.g., a right trapezoid in the example of FIG. 4A. With such a configuration, the liquid input can be placed in front of (as in FIG. 3B) or close to (FIG. 4A) the highest resistance $R_7$, in order to reduce the flow path before the highest resistance. Similarly, the liquid output can be placed close to the output of the highest resistance. Liquid merging is ensured by the liquid coming from the lowest resistance activated.

As evoked earlier, the microfluidic structures can be defined as recessed structures, i.e., cavities or grooves recessed in the thickness of the material subtending the surface S. That is, the microfluidic structures can be obtained as grooves performed in a superficial thickness of the upper material layer of the chip 1, as assumed in the embodiment FIGS. 4-6. Such structures may further all have essentially a same depth. In embodiments such as depicted in FIG. 4, the depths of the recessed structures defined on the surface S differ at the levels of the junctions between the downstream channels 124 and the output channel 130. Namely, said junctions may have a depth that is larger than the average depth of the remaining structures, in order to help in merging the liquids, without creating undesired air bubbles. Note, in variants to recessed structures, the microfluidic structures may be obtained by way of added microstructures, i.e., structures protruding from a supporting surface, such as, e.g., posts, mesas, and a lid tenting over the supporting structures, as assumed in the chip 1a of FIG. 7.

All in all, a design as shown in FIG. 4 allows active flow control in a passive microfluidic system, which makes it possible to combine several resistors with distinct characteristics, thereby enabling a large dynamical range of effective hydraulic resistance. Such a design may notably be used to optimize flow conditions and assay kinetics, after fabrication of the chip. When further using electrogates 121v, 124v such as described below in reference to FIG. 7, a strong liquid pinning can additionally be achieved at the gates 121v, 124v, allowing precise flow control. In fact, all embodiments depicted in FIGS. 4-6 assume electrogates as shown in FIG. 7. Electrogates can notably be formed by exploiting a geometrical pinning effect (e.g., a trench created across the flow path or an abrupt widening in the channel, along the y-axis) or a local hydrophobic layer to stop the liquid flow (i.e., zero capillary pressure) and by overcoming this barrier by applying a potential difference between the liquid and the substrate or the hydrophobic layer (i.e., electrowetting). In variants, one may rely on electroosmotic or electrothermal principles to resume the liquid flow from the pinning gate.

The design of the chip 1 shown in FIG. 4B further allows electrical conductors 21, 22 to be patterned on the surface S, which conductors connect the valves to respective electrical contacts 21p, 22p. Additional conductors 150 may be patterned along the capillary pump 140, e.g., to allow capacitive measurements to monitor the liquid and its flow rate during the capillary flow. The electrical contacts 21p, 22p are used to activate the electrogates 121v, 124v. The conductors 150 are used to capacitively monitor the liquid flow progression. The design shown in FIG. 4B makes it possible to measure the actual flow rate of the liquid corresponding to the activated resistors and tune it by triggering more resistors if needed.

A parallel arrangement of the resistors portions as shown in FIGS. 3, 4 means that each resistor portion connects the input channel 110 to the output channel (or an intermediate channel leading to the output channel), in a parallel fashion. Such a design typically requires a larger chip area (all things being otherwise equal) and further requires merging multiple liquid fronts. Thus, in variants to parallel arrangements, the resistors can be connected in series, wherein the output of each of the resistors (except the last) leads to the next resistor, as now described in reference to FIGS. 2B and 5, in respect to another class of embodiments.

In such embodiments, N resistor portions 122p are connected in series, to form a continuous channel 120s branching from the input channel 110 and leading to the output channel 130. Compared to a parallel arrangement, such a design is more area-efficient. It further allows a straightforward calculation of the resistances and thus an easier design of the resistors. However, such embodiments allow a limited number (at most N) of combinations of resistances, compared to a parallel arrangement.

In more sophisticated implementations, complex microfluidic networks 120c can be contemplated, which combine series and parallel arrangements of the resistors (or resistor portions), as illustrated in FIG. 2C. Such arrangements cannot be otherwise achieved with prior art solutions. Yet, such variants may not be easy to achieve (e.g., if only a limited number of valves is affordable). Plus, such arrangements may not always be compatible with generic chip designs. Thus, in many situations designs such as shown in FIGS. 3-6 will be relied upon.

Referring back to FIG. 5, the continuous channel 120s formed by the connected resistor portions 122p may for example meander and have constant depth and width. The variable hydraulic resistance is here defined by the actuatable valves and junctions formed therewith, as illustrated in FIGS. 5B-5D.

A resistor array design such as shown in FIG. 5 can be implemented in a chip design (not shown), just like designs of FIGS. 3-4. Such a chip includes at least N−1 auxiliary channels 121 branching from the input channel 110 to said continuous channel 120s and forming junctions therewith, at locations delimiting the resistor portions 122p. The actuatable valves are arranged in respective auxiliary channels. As said, N−1 valves would, in principle, suffice to exploit N channel portions forming the resistor portions 122p. However, the device may include more valves, e.g., N valves branching upstream respective resistor portions 122p, or, even, N+1 valves delimiting the N resistor portions on each end thereof, as assumed in FIGS. 5B-5D, to allow more flexibility in the flow control. The auxiliary channels may for example be regularly spaced, to allow linear increments of the effective flow resistance (assuming the channel 120s has a constant profile). Alternatively, each resistor portion 122p may have a different resistance (e.g., logarithmic scale) to achieve a higher dynamic range. The operation of the resistor array shown in FIGS. 5B-5D is described in detail below, in reference to another aspect of the invention.

Referring now to FIG. 7, implementations of the valves are now briefly described, in reference to a chip 1a, where the microfluidic structures are defined on a reference surface, by way of microstructures 27-29. In such embodiments, each valve includes a liquid-pinning trench 25 arranged in a respective auxiliary channel 12n. This channel 12n defines a flow path for a liquid introduced therein. The trench 25 forms an opening 25o that extends across said flow path. In addition, an electrode 21 extends across this flow path, so as to at least partly overlap with the liquid-pinning trench 25. Such valves (also referred to as electrogates herein) allow an efficient, reliable, and easy-to-implement flow control mechanism, relying on simple geometrical pinning and electrode structures, which can easily be fabricated using techniques known in the fields of microfluidics or point-of-care diagnostic (POCD) devices employing microfluidics and electrodes. In addition, such a method requires relatively low actuation voltages (typically <10 V) to resume the liquid flow. A microfluidic chip having gates such as described herein can be controlled with a compact and portable system, e.g., via smartphone connectivity. Such electrogates and corresponding control systems are discussed in detail in section 2.

Referring to FIGS. 5 and 7, another aspect of the invention is now described, which concerns a method for controlling a flow of liquid L in a microfluidic device. This method relies on a microfluidic chip 1, 1a such as described above. It essentially revolves around introducing liquid L in the input channel 110 for the liquid to reach the output channel 130 via the resistor structure. In addition, the actuation state of the valves is maintained or modified so as to achieve a desired, effective hydraulic resistance of the resistor structure 120. The valves can be operated prior to, while, or after introducing the liquid.

For example, one (or more) of the valves may be actuated, so as to modify the overall actuation state of the valves and thereby alter the flow rate $Q_f$ of the liquid in the output channel 130, as illustrated in FIG. 5. Again, the valves can be configured as electrogates, each comprising a liquid-pinning trench 25 and an electrode 21, the latter overlapping (at least partly) with the trench 25. Thus, liquid L introduced in the input channel 110 (where the liquid has a flow rate $Q_i$) may reach each of the gates and get pinned at the trenches 25, as illustrated in FIG. 5B (see also FIGS. 7B and 7C). Next, the actuation state of the valves can be modified by applying a direct current (DC) voltage to liquid L pinned at one of the trenches, via a corresponding electrode 21, for the liquid L to overcome said trench 25 and reach the output channel 130, as illustrated in FIGS. 5C and 5D (see also FIG. 7D).

By actuating a given valve 121v (FIG. 5C, as indicated by the upward arrow), a first effective hydraulic resistance value $R_A$ is obtained. Actuating a second valve (while switching off the DC voltage initially applied) located upstream the first valve selected allows a second effective hydraulic resistance value RB to be obtained (FIG. 5D), which is larger than $R_A$ in this example, though less than the total resistance $R_{Tot}$ of the channel 120s. Thus, the effective hydraulic resistance can be dynamically varied, by actuating one or more of the valves and, this, after fabrication of the chip.

The above embodiments have been succinctly described in reference to the accompanying drawings and may accommodate a number of variants. Several combinations of the above features may be contemplated. Examples are given in the next section.

2. Specific Embodiments—Technical Implementation Details 2.1 Electrogates

As explained earlier in reference to FIG. 7, auxiliary channels 12n define respective flow paths for a liquid L introduced therein, in operation. An electrogate comprises a liquid-pinning trench 25, arranged so as to form an opening 25o that extends across a flow path defined by a channel 12n. A depth of the trench 25 extends transversally to the flow direction imposed to the liquid by the channel 12n. The gate further includes an electrode 21 (i.e., an electrode contact) that extends across the flow path too. As such, the electrode 21 overlaps, at least partly, with the trench 25.

When introducing a liquid L in a given channel 12n, the liquid advances along the flow path defined by this channel and get pinned at the trench 25 (FIG. 7A). Then, a direct current (DC) voltage can be applied to the pinned liquid L, via the electrode 21, for the liquid L to overcome the trench 25 and further advance along a residual portion of the flow path. E.g., a DC voltage pulse is applied between the pinned liquid L and the gate, via the (first) electrode 21 and a second electrode 22. Thus, the gate 21, 25 enables simple flow control.

The trench 25 is a depression, i.e., a cavity that extends from the flow path, transversal thereto. That is, the depth of the trench extends transversally (e.g., perpendicularly) to the flow direction defined along the flow path. On the other hand, the opening 25o formed by the trench 25 extends across the flow path, i.e., over the whole width (measured along axis y) of the channel 12n. The trench 25 defines an opening 25o that extends across the flow path and interrupts the latter, so as to pin a liquid L at the upstream edge of the trench 25. The trench 25 can be regarded as a slit, i.e., a rather long and narrow cut that typically has a rectangular cross-section. In other words, its length (as measured in the plane (x,y)) is likely larger than its width (measured along x), which itself is typically larger than its depth (along z).

The electrode 21 can in some embodiments coat the trench 25, at least partly. In variants, the trench is opened so as to reach an electrode layer (underneath). In all cases, the electrode 21 comprises a part (i.e., a terminal contact) that extends across the flow path so as to at least partly overlap features of the trench 25. Namely, the electrode contact 21 covers one or more longitudinal edges (i.e., the longer edges of the opening 25o) and/or one or more walls (sidewalls, bottom wall) of the trench 25, or form a bottom wall of the trench 25. The electrode 21 can coat an upstream edge of the trench 25 and/or angles formed between the trench 25 and lateral walls of the channel 12n, as described below.

The configuration of the electrode 21 and the trench 25 as proposed here markedly differs from that of a capillary burst valve. Indeed, the liquid pinning structures (edges) of a capillary burst valve are flared in-plane with the inlet channel, which, as one may realize, makes it difficult to pattern electrodes on the out-of-plane walls of the valve that form the pinning edges. In addition, when resuming the liquid flow, liquid that passes the pinning edges of the valve fills the larger (in-plane) area formed by the capillary burst valve, leading to longer reaction times. On the contrary, the gates 21, 25 as contemplated herein involve trenches having a transversal depth, in which no liquid gets trapped. Also, an electrode 21 can easily be patterned at or close to the pinning features of the trench. And when resuming the liquid flow by electrowetting, liquid that passes the pinning edges may instantaneously fill the outlet channel. Also, the gate designs as used herein do not impose any additional hydraulic resistance to the flow path unlike conventional capillary burst valves, which typically require a substantial narrowing in the channel width.

Thus, such gates allow an efficient, reliable, and easy-to-implement flow control mechanism, which relies on simple geometrical pinning and electrode structures, and which can easily be fabricated using techniques known in the fields of microfluidics or point-of-care diagnostic (POCD) devices. Because it allows the electrode 21 to be more strategically positioned to resume the liquid flow, an additional benefit of such gates is that the operation of the device requires relatively low actuation voltages (<10 V). Thus, a microfluidic chip having gates 21, 25 such as described above can be controlled with a compact and portable system 50, e.g., via smartphone connectivity, as illustrated in FIG. 7.

The flow path is defined by one or more walls 26-28 of the channel 12n. For example, the channel 12n includes a bottom wall 26 and lateral (side) walls 27, 28. The lateral walls 27, 28 extend on each side of the bottom wall 26 and contiguous therewith, as assumed in FIG. 7. Thus, the opening 25o of the trench 25 extends across the bottom wall 26 of the channel 12n, while the depth of the trench 25 extends transversally (e.g., perpendicularly) to the bottom wall 26, e.g., toward a substrate 10 underneath. Such a design eases the fabrication process of the channel 12n and the trench 25; the latter is more easily machined through the bottom wall 26 (e.g., through layers 10, 11 underneath). In variants, the trench 25 may extend across any of the walls 27, 28 or even a cover 12 of the channel 12n. Such variants, however, make it more difficult to process the trench. In less likely variants, the channel 12n may be designed as a conduit, i.e., it may not have distinct walls 26, 27, 28 but instead be defined by a single, continuous rounded wall, and the trench may be formed transversally to this wall.

As further seen in FIG. 7, the gate may require a second electrode 22 (i.e., an electrode contact). The electrode 22 is electrically insulated from the first electrode 21. The electrode 22 is otherwise suitably arranged in the device (e.g., in the channel 12n), so as to be contacted by the liquid L introduced therein, in operation. The second electrode 22 is for example located in the vicinity of a liquid loading pad 14, as assumed in FIG. 7. In variants, any electrically conductive part of the device 1, 1a may be relied upon, to play the role of a second electrode, provided this part is suitably located in the device and so as to contact the liquid L, in operation. Thus, there is no strict need to explicitly pattern a second electrode 22. The second electrode 22 may also be implemented as an off-chip electrode (e.g., needle, probe, paperclip), adapted to be placed in the device, so as to contact the liquid, e.g., in the loading pad.

The microfluidic chip 1, 1a is operated thanks to voltage control means 30, 50 connected to the first and second electrodes 21, 22. Such control means may notably include electrical circuit elements 30, suitably connected (or connectable) to electrodes 21, 22 of the device, e.g., via electrical pads 21p, 22p, see FIG. 4B. Such control means 30, 50 can be provided separately, though elements of the circuit (such as electrical traces 21, 22, electrical pads 21p, 22p, other contacts, etc.) are typically provided on the chip 1, 1a, to ease the connectivity. In all cases, the control means 30, 50 need be configured to apply a DC voltage to the liquid L, e.g., between the first and second electrodes 21, 22, so as to apply a DC voltage between the liquid L and the electrode 21 at the gate. Thanks to the low voltage biases required here, the gates 21, 25 may for example be controlled with a compact and portable system 50, e.g., using smartphone connectivity. To that aim, other peripheral devices may be needed, which are known per se.

As illustrated in FIGS. 4, 5, the device will likely include several gates. A corresponding set of electrode contacts 21, 22 may thus be provided, which at least partly overlap respective trenches 25, see FIG. 4B. Interestingly, the electrode contacts 22 may be connected so as to form a single, common electrode, which is advantageous, inasmuch as the number of pads 21p, 22p is typically limited by the chip size and the type of the socket.

As seen in FIG. 7C, the trench 25 can have a curvature. That is, the opening 25o of the trench exhibits a convex profile (as seen from the liquid L advancing toward the trench) across the flow path, e.g., across the bottom wall 26 of the channel 12n. This profile refers either to the longitudinal edges of the opening 25o of the trench 25 (i.e., edges extending in (x,y), see FIG. 7C) or to the median edge of the opening 25o. In other words, the opening 25o opposes a convex shape to the liquid filling front.

This profile results in acute external angles $\alpha$ with the lateral walls 27, 28 of the channel 12n. Such angles are measured in the plane of the bottom wall 26, at intersections between the bottom wall 26 and said walls 27, 28 in FIG. 7C. Thus, the convex shape of the profile gives rise to an acute external angle $\alpha$ at each intersection. This, in turn, decreases the capillary pressure in the intersection regions and improves the stability of the pinning. More generally, a curved profile can be leveraged to improve the stability and, thus, the retention time of the liquid L at the upstream edge of the trench 25.

The profile of the opening 25o may be polygonal. In embodiments of the invention though, the opening 25o has a curvilinear profile. This profile may for instance correspond to a circular arc (i.e., a minor arc of a circle). Yet, the opening 25o can have a semi-circular profile (with the arc oriented for its apex to face the liquid filling front), which further reduces the angle α formed at each of the lateral walls 27, 28 of the channel 12n. This improves the stability and therefore allows longer time retention of the liquid L at the trench 25.

Several improvements can be contemplated to further improve the stability of the pinned liquid. For example, assuming the opening 25o has a semi-circular profile, the radius of curvature of the profile is can be made slightly larger than the half-width of the channel 12n. This makes it possible to achieve stronger retention capability. As illustrated in FIG. 7C, the radius of curvature and the half-width of the channel are both measured in the plane (x,y), i.e., the plane of the bottom wall 26 of the channel 12n; the width of the channel is measured along axis y in FIG. 7C.

The dimensions of the trench 25 can be optimized. For example, referring to FIG. 7A, the trench 25 can be processed so as to have a minimal depth of ~0.9 μm (±0.1 μm), which depth is essentially constant. The depth of the trench is measured perpendicularly to the bottom wall 26 of the channel 12n (i.e., along z). Now, although any depth length may be contemplated, in principle, to provide a pinning effect, experiments have shown that a channel depth larger than or equal to ~14 μm (±1 μm) favors a stable, long-lasting liquid pinning at the trench in practice (retention times of several 10s of min can then be achieved).

In addition, the trench 25 can be processed so as to have a width (along x) that is larger than or equal to 5 μm (±0.1 μm). The width of the trench is measured parallel to the bottom wall 26 of the channel 12n, in the direction x of propagation of the liquid, contrary to the width of the channel 12n (measured along y). The width of the opening 25o is, however, less critical than the depth of the trench in practice. Yet, providing a trench width of at least 5 μm makes it possible to relax the resolution requirements for photolithography.

The electrode 21 and the trench 25 can be structured so as for the electrode to coat (at least partly) one or more walls of the trench 25 and/or one or each of the longitudinal edges that define the opening 25o of the trench 25. This way, electrodes can easily be obtained, e.g., by patterning the electrode after having opened the trench 25. For example, Pd electrodes may be used, which are 80 nm thick and are deposited on a 5 nm Ti adhesion layer (using e-beam evaporation). Thus, the electrode material may not be in direct contact with the walls of the trench 25. Other materials can be contemplated for the contacts.

2.2 Resistance Design

In the following, three types of resistance designs are assumed:
(i) Identical resistances: each resistance is equal to R,
(ii) Resistances increasing linearly, i.e., $R_i = i\,R$, and
(iii) Resistances increasing geometrically, i.e., $R_i = 2^i R$.

For each configuration, the resistances can be chosen to achieve a similar, maximal equivalent resistance $R_{eq,max}$.

First, assume a parallel design, in which all resistance $R_i$ are equal to R. The general equation is:

$$R_{eq} = \frac{1}{\sum_{i=1}^{N} \frac{1}{R_i}}$$

As all resistances are equal, the equivalent resistance is $$R_{eq} = \frac{R}{7}.$$

If the resistances are now equally spaced (R, 2 R, 3 R, . . . ), the equivalent resistance becomes $$R_{eq} = \frac{R}{\sum_{i=1}^{N} \frac{1}{i}}.$$

For example, if R=1, then $0.39 \leq R_{eq} \leq 7$.

Next, if resistances increase geometrically (i.e., each resistance is the double of the previous one, then $$R_{eq} = \frac{R}{\sum_{i=1}^{N} \frac{1}{2^i}}$$

Thus, if R=1, then $0.504 \leq R_{eq} \leq 64$. Geometrically increasing resistances in a parallel configuration typically provide good results in practice, allowing an efficient design with linear flow rate selection, as Inventors observed.

Assume, for example, that a resistor array is to be achieved, which covers a chosen dynamic range of resistances $[R_{tot,min}; R_{tot,max}]$, and uses $N \geq 2$ different resistances $(R_1 \leq R_2 \leq \ldots \leq R_N)$. To create such an array, the following equations need be verified:

$$R_N = R_{tot,max} \tag{1}$$

$$R_1 = \frac{R_{tot,min} \prod_{i=2}^{N} R_i}{\left(\prod_{i=2}^{N} R_i\right) - R_{tot,min} R_N \left(\sum_{i=2}^{N-1} \prod_{j=2; j \neq i}^{N-1} R_j\right) - R_{tot,min} \prod_{i=2}^{N-1} R_i}, \text{ and} \tag{2}$$

$$\text{For } i \in [2; N-1] : R_{i+1} - R_i = \tag{3}$$

$$R_i - R_{i-1} (\text{in a parallel linear arrangement})$$

Note, if N=3, one has $(\sum_{i=2}^{N-1} \prod_{j=2; j\neq i}^{N-1} R_j) = 1$ in equation 2 above. If N=2, then $$R_1 = \frac{R_{tot,min} R_2}{R_2 - R_{tot,min}},$$

whereas equation 3 becomes $$\frac{R_{t+1}}{R_t} = \frac{R_t}{R_{t-1}}$$

for a binary geometric case.

The dimensions (length, width, depth) of the individual resistors can be determined based on equations determining the successive resistance values, such as exemplified above for parallel arrangements.

Assume now an arrangement of resistances in series, for which the general equation is:

$$R_{eq} = \Sigma_{i=1}^{n} R_i$$

If all resistances are equal (say R=1), then $1 \leq R_{eq} \leq 7$. An arrangement of identical resistances in series provides fairly good results in practice, depending on the application.

Choosing a linear resistance progression instead of constant resistances results in non-linear flow rates in output. Such arrangements provide a satisfactory precision for slower flow rates, but the precision deteriorates for faster flows. If the resistances are equally spaced (R, 2 R, 3 R, etc.), the equivalent resistance is $R_{eq} = R \Sigma_{i=1}^{N} i$, leading to, e.g., $1 \leq R_{eq} \leq 28$ (assuming R=1) in a case where 7 resistors are relied on (providing 14 unique values of resistances). Such an arrangement results in a higher dynamic range than the previous case.

Finally, in the geometric case (each resistance is the double of the previous one), the equivalent resistance writes as $R_{eq} = R \Sigma_{i=1}^{N-1} 2^i$, such that $1 \leq R_{eq} \leq 127$ (again, assuming R=1).

Note, a series arrangement of custom resistances can be contemplated too, whereby the output flow rate can be linearized, at the cost of reducing the dynamic range.

2.3 Microfluidic Structures

The present microchannels (also referred to as "channels") can be formed as grooves on a main surface S of a substrate, as assumed in FIGS. 4-6. The substrate is for instance an essentially planar object, such as a chip, a wafer or any such planar support. However, the substrate may include several layers and various structures formed thereon, in particular microstructures and other microfluidic features, such as capillary pumps, anti-wetting structures, flow resistors, and vents. A characteristic dimension (e.g., width or depth) of the channels and other microfluidic features will normally be in the micrometer-length range, i.e., typically between 1 µm and 200 µm. Yet, some particular structures of the present devices 1, 1a may be in the nanoscale range or in the millimeter range, the devices as a whole typically being in the centimeter range.

As said, the channels (and the device 1, 1a as a whole) can be designed so as to allow capillary-driven flows of liquids, though the present concepts can be extended to liquid flows urged along a non-wetting flow path.

The present devices typically include a cover 12, or lid. In other words, any channel can be closed by a capping component 12 (typically having a flat lower surface). In the examples of FIG. 7, the channel 12n is closed by a cover 12 that extends opposite to the bottom wall 26 of the channel (with respect to lateral walls 27, 28 and end sidewalls 29). The cover 12 includes an aperture 14 suited for introducing the liquid L in the channel 12n, as illustrated in FIG. 7A, see also FIG. 4B. The cover does not cover the lower electrical contacts 22p, 21p. The cover 12 may for instance be a dry film resist and may possibly be sealed (e.g., by lamination) after fabrication of the device. Thus, the device may initially be provided without any cover 12. In addition, the cover may be removable, such that the present chips may not systematically include a cover 12.

The surface S on which the flow paths are formed is the surface of a material that shall typically be a polymer (e.g., a SU-8 polymer), an elastomer (e.g. polydimethylsiloxane), silicon dioxide, glass, and cellulose-based material (paperboard, paper, etc.). Other materials may be contemplated, as known in the art.

Fabrication methods relying on anisotropic silicon etching may for instance be employed to obtain flush electrode surfaces and other electrical traces. Namely, the surface of an electrode (extending across the flow path 20) that is exposed to the liquid can be fabricated so as to be level, or essentially level, with a surrounding surface in the flow path.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A microfluidic chip comprising:
a surface with microfluidic structures formed thereon, the structures forming:
an input channel;
an output channel;
auxiliary channels; and
a hydraulic resistor structure connecting the input channel to the output channel via the auxiliary channels;
wherein the hydraulic resistor structure comprises N flow resistor portions connected in parallel between the input channel and the output channel via the auxiliary channels, where N≥2, and wherein each of the flow resistor portions is distributed along the input channel in order of deceasing hydraulic resistance such that a first flow resistor portion nearest an end of the input channel comprises a highest hydraulic resistance and such that a fluid deposited at the end of the input channel will reach each respective flow resistor portion in the decreasing order of hydraulic resistance;
wherein each of the flow resistor portions comprises a distinct footprint resulting in each of the flow resistor portions having a distinct hydraulic resistance, wherein each distinct footprint comprises one or more bends, a length greater than zero, and a width greater than zero, and wherein each distinct footprint comprises a unique combination of bends, length, and width; and
wherein the chip further includes at least N−1 actuatable valves arranged in respective ones of the auxiliary channels, the at least N−1 actuatable valves each comprising a liquid-pinning trench and an electrode configured such that each electrode, upon actuation, blocks or allows flow across the liquid-pinning trench of the respective flow resistor portion, whereby an actuation state of the respective electrodes of the at least N−1 actuatable valves determines a combined hydraulic resistance of the resistor structure by selecting which ones of the flow resistor portions contribute to an output flowrate from the output channel.

2. The chip according to claim 1, wherein:
the chip includes pairs of auxiliary channels;
the pairs of auxiliary channels include upstream channels branching from the input channel to respective ones of the resistor portions;
the pairs of auxiliary channels further include downstream channels branching from respective ones of the resistor portions to a section of the output channel; and
the valves are located in one or each of the upstream channels and the downstream channels of at least some of the pairs of auxiliary channels.

3. The chip according to claim 2, wherein:
the resistor portions are formed as distinct resistors, which form channel sections of successively decreasing footprint lengths measured along an average flow propagation direction y in the resistors, which direction y is transverse to each of the input channel and said section of the output channel in a plane subtended by said surface; and
the input channel does not extend parallel to said section of the output channel in order to accommodate said decreasing footprint lengths.

4. The chip according to claim 2, wherein:
the chip includes N pairs of said actuatable valves, wherein valves of each of the N pairs are arranged on opposite sides of the resistor portions.

5. The chip according to claim 2, wherein said microfluidic structures are defined as recessed structures, which are recessed within a thickness of a material exhibiting said surface.

6. The chip according to claim 5, wherein the recessed structures defined on said surface have a constant depth except at levels of junctions between the downstream channels and the output channel, wherein said junctions have a depth that is larger than an average depth of said recessed structures.

7. The chip according to claim 1, wherein the N resistor portions are connected in series, so as to form a continuous channel branching from the input channel and leading to the output channel.

8. The chip according to claim 7, wherein the chip includes at least N−1 auxiliary channels branching from the input channel to said continuous channel, at locations delimiting said resistor portions, said actuatable valves being arranged in respective ones of said at least N−1 auxiliary channels.

9. The chip according to claim 1, wherein:
the liquid-pinning trench arranged in a respective one of the auxiliary channels defines a flow path for a liquid introduced therein, so as to form an opening that extends across said flow path; and
the respective electrode extends across said flow path so as to at least partly overlap with the liquid-pinning trench.

10. The chip according to claim 9, wherein the flow path is defined by walls of said respective one of the auxiliary channels, which include a bottom wall and lateral walls arranged on each side of and contiguous with the bottom wall, whereby the opening of the trench extends across said bottom wall.

11. The chip according to claim 10, wherein the trench has a curvature, whereby the opening has a convex profile across said bottom wall, said profile forming acute external angles with said lateral walls, in a plane subtended by the bottom wall and at intersections between said bottom wall and said lateral walls.

12. The chip according to claim 11, wherein the opening has a curvilinear profile.

13. The chip according to claim 1, wherein the chip includes at least N−1 auxiliary channels branching from the input channel to said resistor structure, and the actuatable valves are arranged in respective ones of said at least N−1 auxiliary channels.

14. The chip according to claim 1, wherein each of the resistor portions connects from the input channel via a respective one of the auxiliary channels, in which one of said actuatable valves is arranged, and each of the resistor portions connects to a section of the output channel via a one-way capillary valve that comprises a vent.

15. The chip according to claim 1, wherein said microfluidic structures are defined as recessed structures, which are recessed within a thickness of a material exhibiting said surface, said recessed structures having essentially a same, constant depth.

16. A method for controlling a flow of liquid in a microfluidic device, the method comprising:
providing a microfluidic chip comprising a surface with microfluidic structures formed thereon, the structures forming: an input channel, an output channel, auxiliary channels, and a hydraulic resistor structure connecting the input channel to the output channel via the auxiliary channels;
wherein the hydraulic resistor structure comprises N flow resistor portions connected in parallel between the input channel and the output channel via the auxiliary channels, where N≥2, and wherein each of the flow resistor portions is distributed along the input channel in order of deceasing hydraulic resistance such that a first flow resistor portion nearest an end of the input channel comprises a highest hydraulic resistance and such that a fluid deposited at the end of the input channel will reach each respective flow resistor portion in the decreasing order of hydraulic resistance;
wherein each of the flow resistor portions comprises a distinct footprint resulting in each of the flow resistor portions having a distinct hydraulic resistance, wherein each distinct footprint comprises one or more bends, a length greater than zero, and a width greater than zero, and wherein each distinct footprint comprises a unique combination of bends, length, and width; and
wherein the chip further includes at least N−1 actuatable valves arranged in respective ones of the auxiliary channels, the at least N−1 actuatable valves each comprising a liquid-pinning trench and an electrode configured such that each electrode, upon actuation, blocks or allows flow across the liquid-pinning trench of the respective flow resistor portion, whereby an actuation state of the respective electrodes of the at least N−1 actuatable valves determines a combined hydraulic resistance of the resistor structure by selecting which ones of the flow resistor portions contribute to an output flowrate from the output channel;
introducing a liquid in the input channel for the liquid to reach the output channel via the hydraulic resistor structure; and maintaining or modifying the actuation state of the at least N−1 actuatable valves, so as to achieve a desired hydraulic resistance of the resistor structure.

17. The method according to claim 16, wherein the method further comprises actuating at least one of the valves, so as to modify the actuation state of the valves and thereby alter the flow rate of the liquid in the output channel.

18. The method according to claim 16, wherein:
said valves are configured as gates, and each respective liquid-pinning trench is arranged in a respective one of the auxiliary channels to define a flow path for the liquid introduced therein, so as to form an opening that extends across said flow path;
wherein each respective electrode extends across a respective flow path so as to at least partly overlap with the liquid-pinning trench;
wherein the liquid is introduced in the input channel, so as to reach each of the gates and get pinned at liquid-pinning trenches of the gates; and
wherein modifying the actuation state of the valves comprises applying a direct current voltage to liquid pinned at one or more of the trenches, via one or more electrodes of the gates, for the liquid to overcome said one or more of the trenches and reach the output channel.

* * * * *